United States Patent

[11] 3,556,265

[72] Inventor Horacio Shakespear
  Troy, Mich.
[21] Appl. No. 764,261
[22] Filed Oct. 1, 1968
[45] Patented Jan. 19, 1971
[73] Assignee General Motors Corporation
  Detroit, Mich.
  a corporation of Delaware

[54] DISC BRAKE CALIPER HOUSING
  6 Claims, 9 Drawing Figs.
[52] U.S. Cl. .................................................. 188/73.3
[51] Int. Cl. ..................................................... F16d 55/224
[50] Field of Search........................................ 188/73,
  73Cl, 71.1; 29/417

[56] References Cited
  UNITED STATES PATENTS
  2,612,968 10/1952 Hood............................ 188/73X
  3,256,959 6/1966 Eggstein........................ 188/73
  3,266,602 8/1966 Belart et al. .................. 188/73(C)X
  FOREIGN PATENTS
  257,391 10/1967 Austria.......................... 188/73
  728,376 4/1955 Great Britain................ 188/73

Primary Examiner—George E. A. Halvosa
Attorneys—D. D. McGraw and W. E. Finken

ABSTRACT: A disc brake caliper housing is made from an extruded pipe by cutting the pipe into segments and transversely notching each segment to provide space for receiving the disc to be braked and for mounting the brake pads. The pipe cross section pattern provides suitable openings for mounting wheel cylinder assemblies, for cooling, and for weight reduction.

PATENTED JAN 19 1971 3,556,265
SHEET 1 OF 2
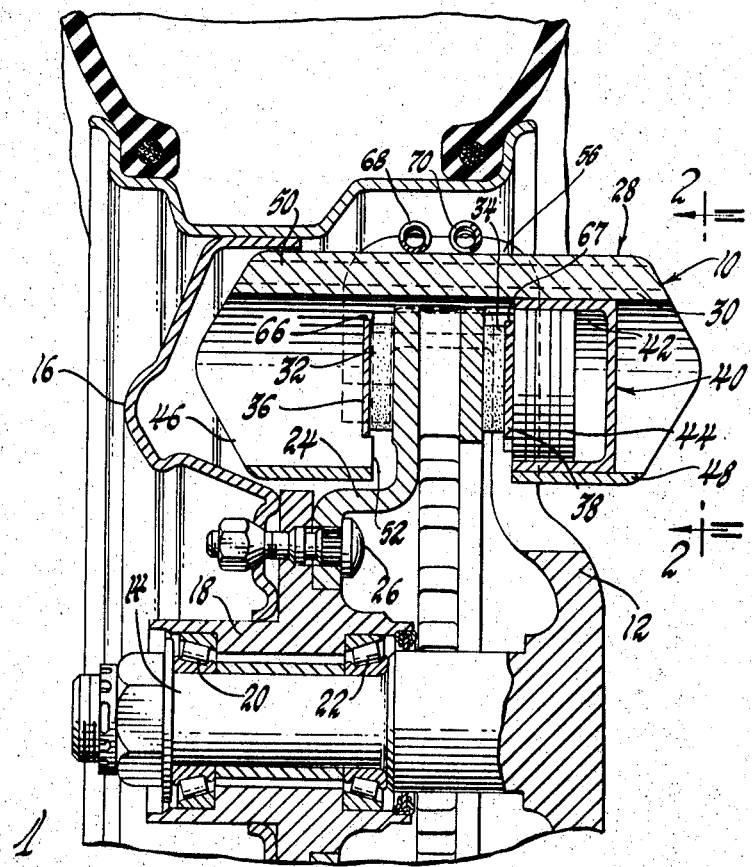
Fig. 1
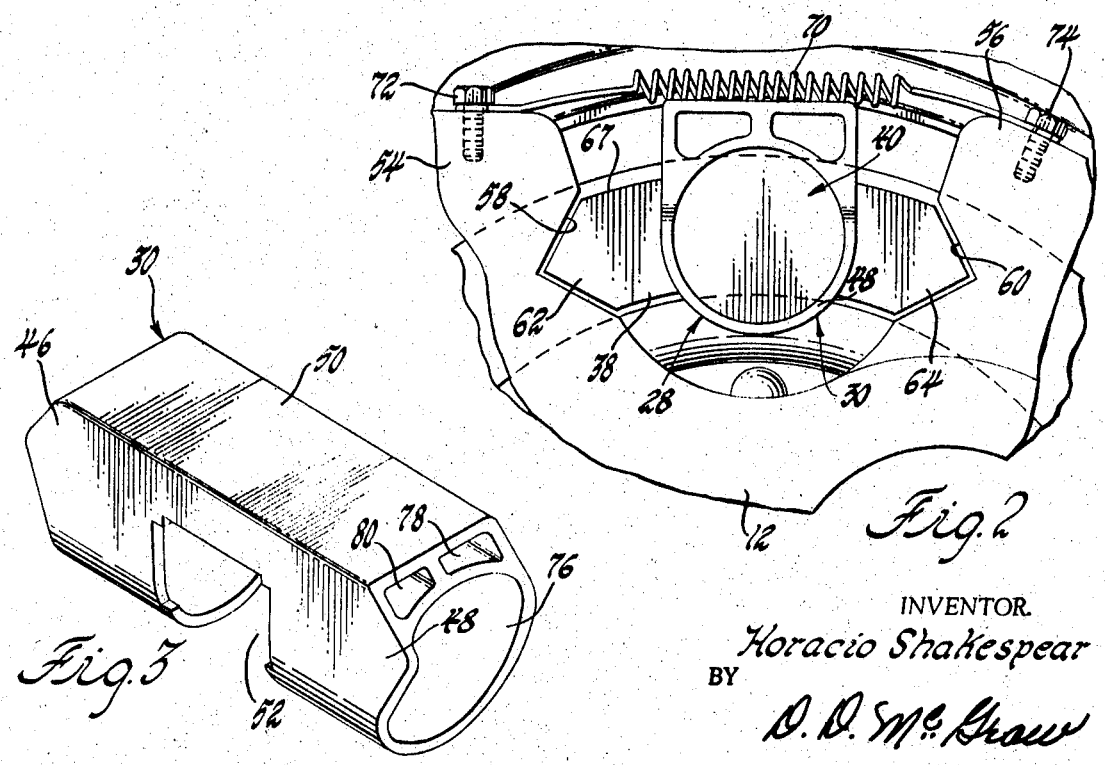
Fig. 3
Fig. 2
INVENTOR.
Horacio Shakespear
BY
D. D. McGraw
ATTORNEY INVENTOR.
Horacio Shakespear
BY
D. D. McGraw
ATTORNEY

DISC BRAKE CALIPER HOUSING

The invention relates to a disc brake and more particularly to a disc brake caliper housing which has opposed side sections and a bridging section joining the side sections, the housing sections all having transversely aligned cross section areas formed to a common cross section pattern. The pattern is obtained by extruding a pipe having suitable longitudinal passages, and forming the housing from a segment of the pipe.

Caliper housings have commonly been manufactured in several sections which are cast, machined and fastened together. Cast housings provide the requisites strength to resist spreading as the brakeshoes are pressed against the opposed surfaces of the disc to be braked, and also to take torque reaction from the disc to the caliper support bracket. When caliper housings are utilized which are not required to take torque reaction, different strength considerations may be given in the design of the housings. By manufacturing housings in accordance with the invention, significant cost reductions may be obtained without sacrificing design features. A minimum amount of machining of the housing is required, resulting in reduced tooling and labor charges as well as a reduction in waste material. A caliper housing embodying the invention is arranged to extend over a portion of a disc to be braked so that the caliper side sections provide suitable mountings for friction pads and the caliper bridging section joining the side sections is adequate to resist the spreading tendency of the side sections when the brakes are applied. Replacement of worn friction pads is accomplished easily without having to break the fluid integrity of the brake system.

IN THE DRAWINGS

FIG. 1 is a cross section view of a disc brake assembly associated with a vehicle wheel to be braked, and utilizing a caliper housing embodying the invention;

FIG. 2 is a view of the caliper housing and mounting arrangement of the brake assembly of FIG. 1 taken in the direction of arrows 2–2 of that FIG.;

FIG. 3 is a perspective view of the caliper housing forming a part of the brake assembly of FIG. 1;

Figure 4:
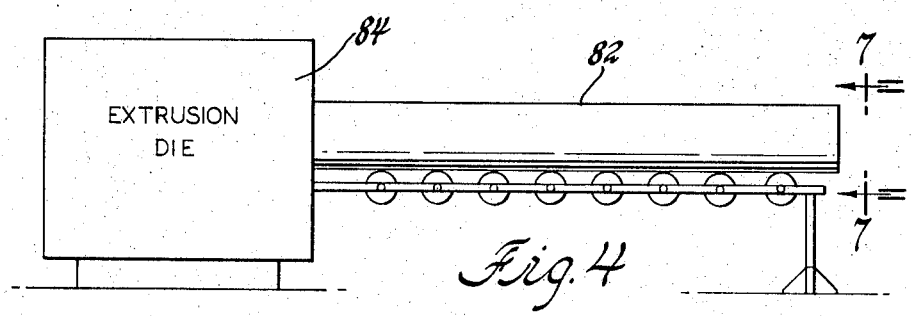
FIG. 4 is a diagrammatic representation of the step of extruding a pipe from which caliper housing units are to be formed.

The brake assembly 10 shown in FIG. 1 includes a mounting bracket 12 attached to or formed as a part of the axle 14 on which the wheel 16 is rotatably mounted by means of the wheel hub 18 and suitable bearings 20 and 22. The brake disc 24 is secured to the hub 18 by means of bolts 26 so that the disc rotates with the wheel. The caliper assembly 28 includes the caliper housing 30, brake friction pads 32 and 34 with their respective backing plates 36 and 38, and a wheel cylinder assembly 40 having a cylinder 42 containing a piston 44 movable therein to cause the friction pads to engage the opposed friction surfaces of the disc 24. In the particular brake illustrated, the caliper housing is movable transversely of the disc when the wheel cylinder assembly is pressurized so as to bring both friction pads into braking engagement with the disc. If desired, a wheel cylinder assembly could be provided on each side of the disc.

The caliper housing 30 has side sections 46 and 48 joined by a bridging section 50 which passes over the outer periphery of disc 24. In the particular housing illustrated, the notch 52 provided transversely through a portion of the housing permits reception of the disc 24 between the housing side sections 46 and 48 and also provides for suitable mounting of the friction pads with their backing plates 36 and 38.

In the brake assembly illustrated, the caliper housing is supported on the friction pad backing plates, as can be better seen in FIG. 2. In this particular arrangement, the mounting bracket 12 has two arms 54 and 56 which e extend parallel to one disc braking surface until they pass beyond the disc outer periphery. They then extend over the disc outer periphery and inwardly parallel to the other disc friction braking surface. The adjacent edges of the arms 54 and 56, as seen in FIG. 2, are recessed at 58 and 60 so as to receive the ends 62 and 64 of the friction pad backing plates. In this construction, the recesses 58 and 60 are provided as notches, and the backing plate ends 62 and 64 are formed with complementary surfaces so that when the backing plates are in position they cannot be moved radially inwardly or outwardly relative to the disc for any appreciable distance. The radially outer edges 66 and 67 of the backing plates rest at the bottom of the caliper housing notch 52 so that the caliper housing is supported on the backing plates 36 and 38 both radially and circumferentially relative to the disc 24. Tension springs 68 and 70 extend across the top of the bridging section 50 of the caliper housing and have their ends fastened by suitable means, such as bolts 72 and 74, to the mounting bracket arms 54 and 56. In this manner sufficient radially inward force is maintained against the caliper housing 30 to keep it in position on the backing plates 36 and 38. This also permits quick removal of the caliper housing by releasing one end of each spring after the wheel 16 is removed and removing the caliper housing by lifting it radially outward. This can be done without disturbing the hydraulic integrity of the brake system. After removal of the caliper housing the friction pad assemblies may be easily replaced. The housing is then again placed over the backing plates and secured in place by fastening the ends of springs 68 and 70.

With this disc brake arrangement the caliper housing 30 is subjected only to transverse loads exerted by pressurization of the wheel cylinder assembly 40. The backing plates 36 and 38 transmit brake torque directly to the mounting bracket 12. The caliper housing therefore maintains itself in alignment at all times.

The caliper housing so shown in FIG. 3 is provided with a circular pipelike passage 76 through which the notch 52 has been transversely cut and in which the wheel cylinder assembly 40 is mounted. The bridging section 50 is an integral part of the side sections 46 and 48, and it can be seen that all of the transversely aligned cross section areas of the bridging and side sections are formed to a common cross section pattern. For example, the longitudinally extending passages 78 and 80 formed through the upper portions of the side sections 46 and 48 and through the bridging section 50 have the same cross section pattern throughout. In different caliper housing designs, different cross section pattern arrangements such as those illustrated in FIGS. 8 and 9 may be provided to obtain the desired housing characteristics.

Figure 5:
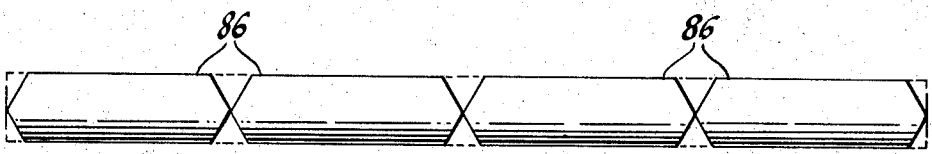
FIG. 5 is a diagrammatic representation of the step of separating the extruded pipe of FIG. 4 into segments, with each segment being a pipe unit which is to become a caliper housing.
Figure 6:
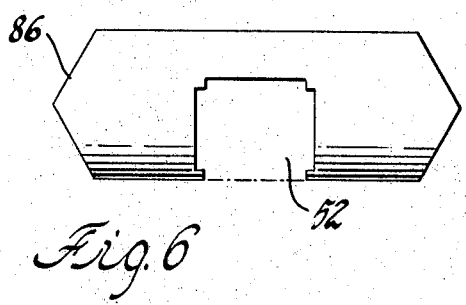
FIG. 6 shows one pipe unit having a notch formed transversely through a portion thereof as another step in the manufacture of the caliper housing.
Figure 7:
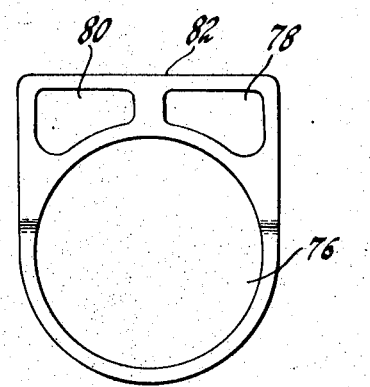
FIG. 7 is an end view taken in the direction of arrows 7–7 in FIG. 4 of the extruded pipe showing the cross section pattern of the pipe.

The caliper housing 30 is made from a section of an extruded pipe in the manner diagrammatically illustrated in FIGS. 4, 5 and 6. The pipe 82 is extruded from the extrusion die 84. The pipe is then transversely severed, as illustrated in FIG. 5, to provide a plurality of pipe units 86. Each pipe unit is then notched to provide notch 52, with the notch passing transversely through a portion of the pipe unit. The notch may be formed by broaching operations. Depending upon the particular housing, other notch forms may be utilized than that shown, as well as other housing ends. In some instances it is preferable to perform the notching operation prior to transversely severing the pipe 82 into the plurality of pipe units 86.

Figure 8:
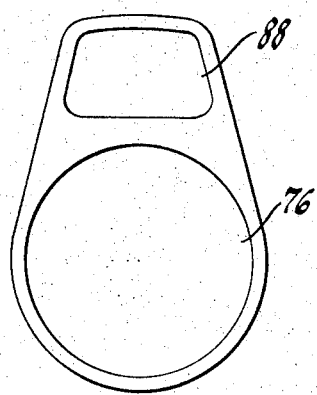
FIGS. 8 and 9 show modified end views of pipes similar to the pipe of FIG. 7 and which may be utilized in the manufacture of disc brake caliper housings embodying the invention.
Figure 9:
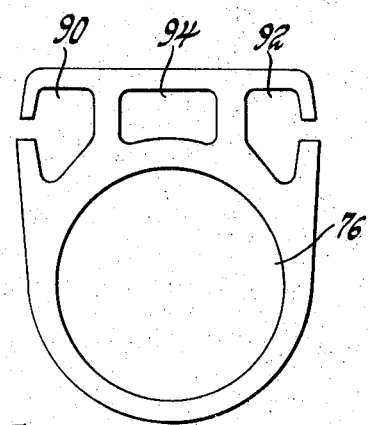

The pipe section shown in FIG. 8 is similar to that utilized for making the caliper housing 30 of FIG. 3. However, in this instance only one passage 88 is provided through the portion of the pipe which ultimately includes the housing bridging section 50. In the construction shown in FIG. 9, passages 90 and 92 are positioned on either side of the passage 94 in the portion of the pipe which eventually becomes the bridging section of the caliper housing. Passages 90 and 92 are illustrated as having slotted outer sides which further decrease weight and the use of material without adversely affecting the strength of the completed caliper housing.

In each of the sections illustrated, it should be noted that the characteristics of an extrusion are maintained. These characteristics include the fact that a common cross section pattern is utilized throughout the caliper housing. Of course, in some housing sections such as the bridging section, only a portion of the pattern exists, the other portion having been removed. It remains, however, a characteristic that all of the parallel lines extending through any portion of any housing, which lines are also parallel to the axis of the pipe member from which the housings are formed, extend through identical points on the common cross section pattern.

I claim:

1. A one-piece disc brake caliper housing having opposed side sections and a bridging section joining said side sections, said bridging and side sections having all transversely aligned cross section areas formed in linear alignment to a common cross section pattern, said common cross section pattern including a pipelike constant cross section area passageway extending entirely through both of said side sections.

2. The caliper housing of claim 1, said common cross section pattern being the pattern of an extruded pipe from which said housing is formed.

3. The caliper housing of claim 1, said bridging section composed of a plurality of walls extending between and through the adjacent portions of said side sections and defining passageways through said bridging section and said side sections having constant cross section areas throughout their lengths.

4. The caliper housing of claim 1, said side sections having portions spaced transversely apart to receive a disc therebetween to be braked, said portions being formed as walls of a passageway extending through said housing.

5. A disc brake caliper housing formed from an extruded pipe member characterized by having a single common cross section pattern and having a disc-and-brake-pad-receiving notch cut transversely therethrough to provide housing side sections on either side of said notch and a bridging section at the closed end of said notch and joining said side sections, said caliper housing having all of the transversely aligned cross section areas thereof so linearly aligned that all parallel lines extending through said housing side sections and said bridging section and parallel to the axis of the pipe member from which the housing is formed pass through identical points within said common cross section pattern to which said cross section areas are formed.

6. The caliper housing of claim 5, the extruded pipe member from which said housing is formed having a plurality of passageways longitudinally therethrough, one of said passageways being transversely intersected by said notch and formed to receive a brake cylinder and piston assembly therein.